United States Patent [19]
Ghil

[11] Patent Number: 5,931,883
[45] Date of Patent: Aug. 3, 1999

[54] METHOD FOR CONTROLLING REVERSE SHIFT RESTRICTION IN DRIVE RANGE OF AUTOMATIC TRANSMISSION VEHICLE

[75] Inventor: Sung-Hong Ghil, Seoul, Rep. of Korea

[73] Assignee: Hyundai Motor Co.,, Seoul, Rep. of Korea

[21] Appl. No.: 08/772,296

[22] Filed: Dec. 23, 1996

[30]      Foreign Application Priority Data

Dec. 28, 1995  [KR]   Rep. of Korea ..................... 95-61939

[51] Int. Cl.⁶ ................................................. G06G 7/70
[52] U.S. Cl. .................................. 701/51; 701/90; 701/69
[58] Field of Search .................................. 701/69, 90, 51

[56]         References Cited
             U.S. PATENT DOCUMENTS 4,574,661   3/1986   Opperud et al. ........................ 74/856
    4,648,289   3/1987   Kubo et al. ............................. 74/866
    4,916,979   4/1990   Irwin ....................................... 74/866

*Primary Examiner*—William A. Cuchlinski, Jr.
*Assistant Examiner*—Arthur Donnelly
*Attorney, Agent, or Firm*—Finnegan, Henderson, Farabow, Garrett & Dunner, L.L.P.

[57]                ABSTRACT

The present invention relates to a method for controlling a reverse shift restriction in a drive "D" range of a vehicle having an automatic transmission. The method for controlling a reverse shift restriction in a drive "D" range of a vehicle's automatic transmission, comprising the steps of generating a frequency signal representative of the vehicle speed and direction. Next, determination of whether creeping is occurring is necessary. The automatic transmission is controlled based on said determination said frequency signal.

1 Claim, 4 Drawing Sheets

METHOD FOR CONTROLLING REVERSE SHIFT RESTRICTION IN DRIVE RANGE OF AUTOMATIC TRANSMISSION VEHICLE

FIELD OF THE INVENTION

The present invention relates to a method for controlling the hydraulic pressure of an automatic transmission to prevent reverse motion of a vehicle while the automatic transmission is in a Drive position. Additionally, the method for controlling the hydraulic pressure provides optimal control of a kick down band during automatic downshifting.

BACKGROUND OF THE INVENTION

Generally, electronics control an automatic transmission system of a vehicle through precisely controlling various valve actuators. Certain of these valves control the hydraulic pressure associated with the planetary gear sets, thereby providing precise shift control for stationary and moving vehicles. In other words, various engine sensors transmit signals, relating to operating conditions of the vehicle, to a transmission control unit ("TCU"). Based on these operating conditions, the TCU controls both shift mode hydraulic pressure and a damper clutch of the automatic transmission to optimize the performance of the vehicle.

The TCU controls various solenoid valve actuators to control the automatic transmission pressure. In other words, the TCU generates a control signal for each solenoid valve. The control signal corresponds to an open/shut position of the solenoid valve. The position of the valves control the hydraulic pressure within the hydraulic control system, which improves shift quality of the transmission system.

To achieve the above described control, detection of the vehicle's running condition, by each input sensor, should be accurate, and TCU should be programmed precisely. By this method, the automatic transmission maintains the hydraulic pressure to achieve the optimal running state of the vehicle under all road and operating conditions. Maintaining this condition requires a minimal amount to no effort on the part of the driver. By adding a control logic, which does not exist in a manual transmission, the automatic transmission is able to accomplish this optimal running state.

The transmission control system, of the prior art, generally has 6 shift modes (or ranges), e.g., a parking "P" range, a reverse "R" range, a neutral "N" range, a drive "D" range, a second "2" range, and a low "L" range. Additionally, the "D" range provides first through fourth forward speed ratios, the "2" range the first and second forward speed ratios, and the "L" range the first forward speed ratio. That is, the driver can select one of the shift modes by shifting a shift selector lever between the modes, "D", "2", or "L". A shift operation occurs when the vehicle is placed in a mode other then "P" or "N".

The TCU controls the forward and reverse speed ratios of the "R", "D", "2", and "L" ranges by controlling the hydraulic control system. The TCU generates the control signal necessary to control the hydraulic pressure based on various engine sensors, including engine rpms and throttle position. In particular, the vehicle's running condition is detected by various sensors, and the detected signals are transmitted to the TCU, such that each speed ratio in one of the "D", "2", and "L" ranges is determined in accordance with a shift pattern programmed in the TCU. When the automatic transmission vehicle is in a forward driving state, the vehicles's running conditions that the TCU uses to control hydraulic pressure include both engine rpms from a vehicle speed sensor ("PG-B"), and a throttle opening sensor's voltage from a throttle position sensor ("TPS"). The TCU then determines the speed ratio in response to the rmp and throttle position signals.

In the conventional automatic transmission, as described above, the transmission control system is designed to drive forwardly when the shift selector lever is in the "D" range. However, the signal supplied to the TCU does not have a direction of motion detector. Therefore, it is possible for the vehicle to inadvertently reverse while the shift selector lever is in the "D" range. For example, a vehicle stopped on a gradient may roll backwards with the shift selector still in a "D" range. The TCU would measure the backwards roll and assume that the vehicle was in forward motion. This phenomenon is generally known as creeping. That is, in this state, the inadvertent reversing of the vehicle cannot be prevented by the TCU as long as the driver does not depress the brake. The conventional automatic transmission, therefore, has a limitation of being unable to control creeping in the "D" range.

This is caused because the conventional automatic transmission is constructed such that the creep control programmed in the TCU can prevent inadvertent reversing on a road having a gentle gradient but cannot prevent the same on a road having a steep gradient. In other words, when the throttle position and engine rpm indicate a stopped state, the TCU applies pressure to the kick down band which prevents the automatic transmission planetary gears from turning. This pressure is capable of preventing the gears from turning on flat as well as gentle gradient. When the road is steeply sloped upward, relatively higher hydraulic pressure should engage respective clutches and brakes to prevent the vehicle from reversing. However, there is no control logic which can achieve this in the conventional automatic transmission.

Additionally, the conventional TCU sensor is designed to generate a frequency signal proportional to the vehicle speed so as to identify the current vehicle speed. However, the conventional TCU design does not discriminate the change between forward and reverse states of the vehicle. That is, when the vehicle is reversed in a state where the shift selector lever is in the drive "D" range, the TCU takes the vehicle's reverse speed for the forward speed and controls the hydraulic control system according to this misidentification.

The creep control of the conventional automatic transmission and the conventional vehicle speed sensor will be described hereinafter with reference to FIGS. 1, 2A and 2B.

As shown in FIG. 1, the conventional method of creep control includes, at step s1, calculating the rotating speed of a transfer drive gear and, at step s10, calculating the rotation speed of a vehicle speed reed switch. These signals constitute the frequency signal. Next, step 12, the method determines if the shift operation is performed or not. As described above, a shift operation exists when the vehicle shift selector lever is in a position other then "P" or "N". At step s14, the method transmits a signal relating to the frequency signal generated in steps s1 and s10 to a shift control part, in the cases where the shift operation is performed. Step s16, the TCU determines whether creep is occurring, based on industry standard methods. Step s16 is only performed when the shift operation is not performed. Step s18, transmitting the signal to a control routine, such that normal control occurs when creeping does not occur; and transmitting the signal to a creep control routine when creeping occurs, step s20.

As described above, the conventional creep control method has a drawback in that it does not consider the rotating direction of the transfer drive gear, that is, the driving direction of the vehicle. Thus, the TCU can inadvertently control hydraulic pressure based upon rolling backwards.

The inadvertent control signal is generated because the conventional TCU has no ability to sense the direction of motion of a vehicle. Referring to FIGS. 2A and 2B, there are shown a structure of a conventional vehicle speed reed switch (speed sensor) and an output wavy pattern, produced by the speed reed switch, induced into the TCU, respectively, illustrating a structural problem of the sensor. The symmetrical design of vehicle speed reed switch, as shown in FIG. 2A, produces a wavy pattern, used as the vehicle speed signal, induced into the TCU, incapable of indicating vehicle direction. In other words, the wavy pattern is the same regardless of the rotating direction of the transfer drive gear, as shown in FIG. 2B. The vehicle speed is measured by the rotational speed of the transfer drive gear. As FIGS. 2A and 2B show, the TCU cannot discriminate vehicle direction, i.e., between forward and reverse driving states, based on the wavy pattern produced by the vehicle speed reed switch.

More in detail, when the system determines the following 4 conditions are satisfied, then the system determines creep is occurring and that creep control is necessary. In the prior art, when it is determined creeping is occurring, the creep control achieves the second speed and generates a pressure control solenoid valve duty ratio of 68.8%. The 4 conditions indicating creep are:

1) The manual selecting signal should be in the "D" or "2" range;

2) The rotation speed of the transfer drive gear is lower than 460 rpm;

3) The idle switch is ON (i.e., the accelerating pedal should not be pressed); and 4) The throttle opening voltage is lower than 0.94 V.

FIG. 3 shows a pressure control solenoid valve duty output during the creep control. As shown in FIG. 3, when the rotation speed of the transfer drive gear is lower than 460 rpm, the creep duty ratio is maintained constantly at 68.8%.

Further, when satisfying one of the following 4 conditions, the vehicle exits the creep state:

1) The manual selecting signal relays being in the P, R, N, or L range;

2) The rotation speed of the transfer drive gear is higher than 460 rpm;

3) The idle switch is OFF, (i.e., the accelerating pedal should not be pressed); and 4) The throttle opening voltage should be higher than 0.94 V.

As described above, the conventional creep control method in the "D" range of the automatic transmission is performed without consideration of the rotating direction relayed by the vehicle speed sensor. It is desirous to identify the vehicle direction to more accurately control the hydraulic press.

SUMMARY OF THE INVENTION

The advantages and purpose of this invention will be set forth in part from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the present invention provides improved methods for controlling an automatic transmission of a vehicle. Specifically, the present invention provides a method of controlling the automatic transmission of a vehicle, comprising the steps of generating a frequency signal representing both a speed of the vehicle and a direction of motion of the vehicle. From the frequency signal, determining whether creeping is occurring and controlling the automatic transmission based on the results of the determination.

BRIEF DESCRIPTION OF THE DRAWINGS

The accompanying drawings, which are incorporated in and constitute a part of this specification, illustrate embodiments of the invention, and, together with the description, serve to explain the principles of the present invention. In the drawings, like reference symbols indicate the same or similar components.

DETAILED DESCRIPTION OF THE PREFERRED EMBODIMENT

Figure 1:
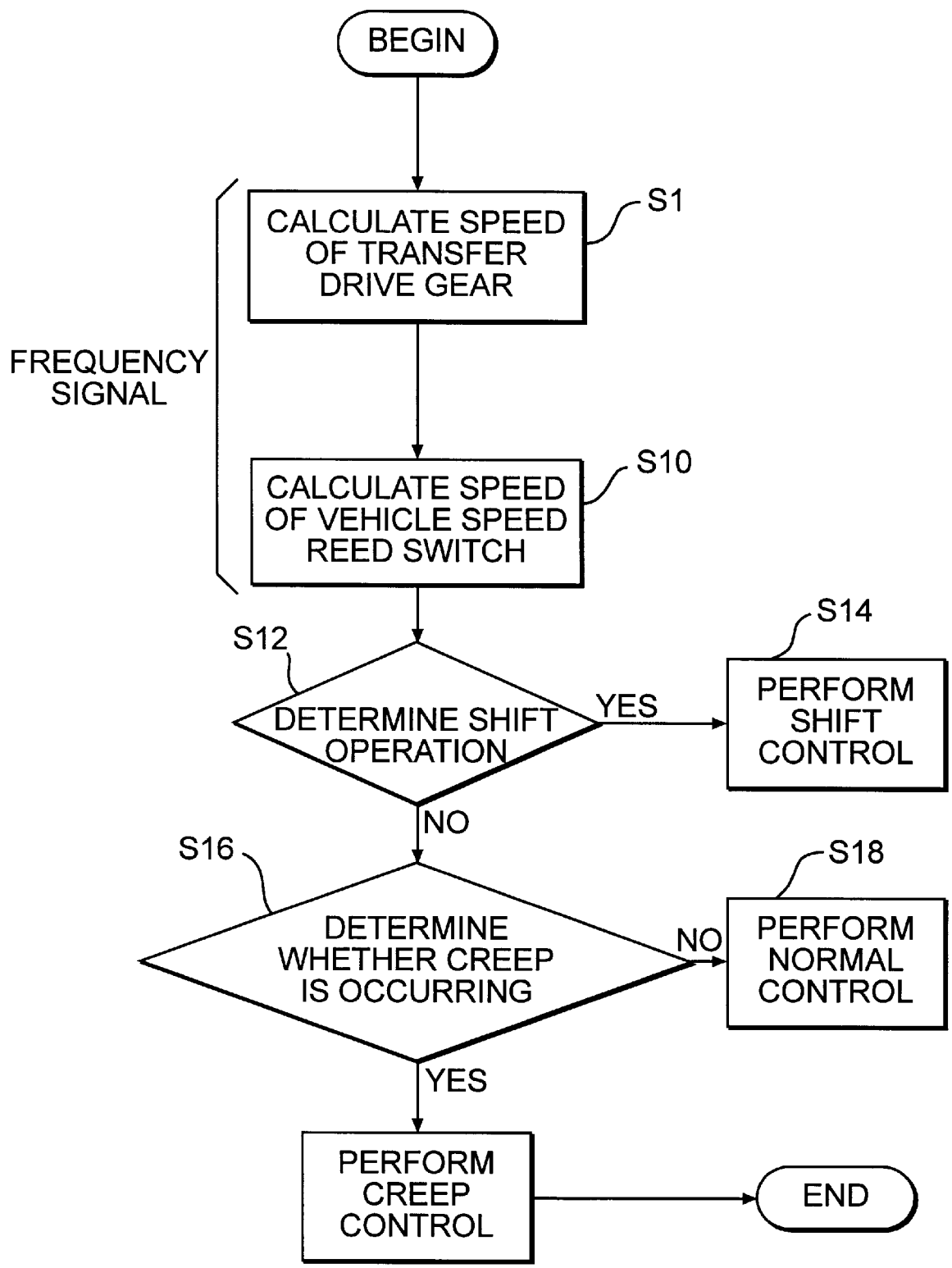
FIG. 1 is a flowchart showing a conventional creep control.
Figure 2A:
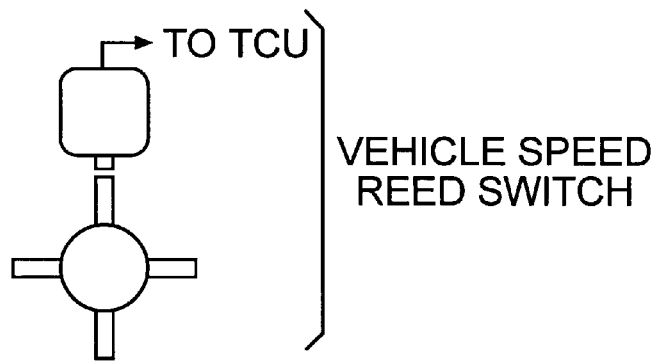
FIG. 2A is a view showing a conventional vehicle speed sensor.
Figure 2B:
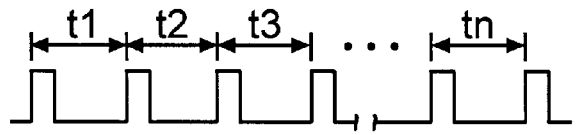
FIG. 2B is an output wavy pattern induced into a TCU according to a conventional creep control.
Figure 3:
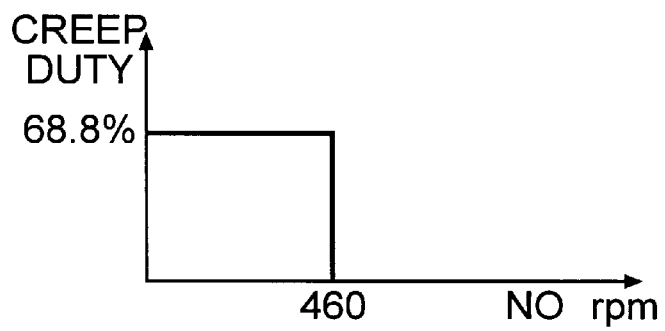
FIG. 3 is a PCSV duty output according to a conventional creep control.
Figure 4:
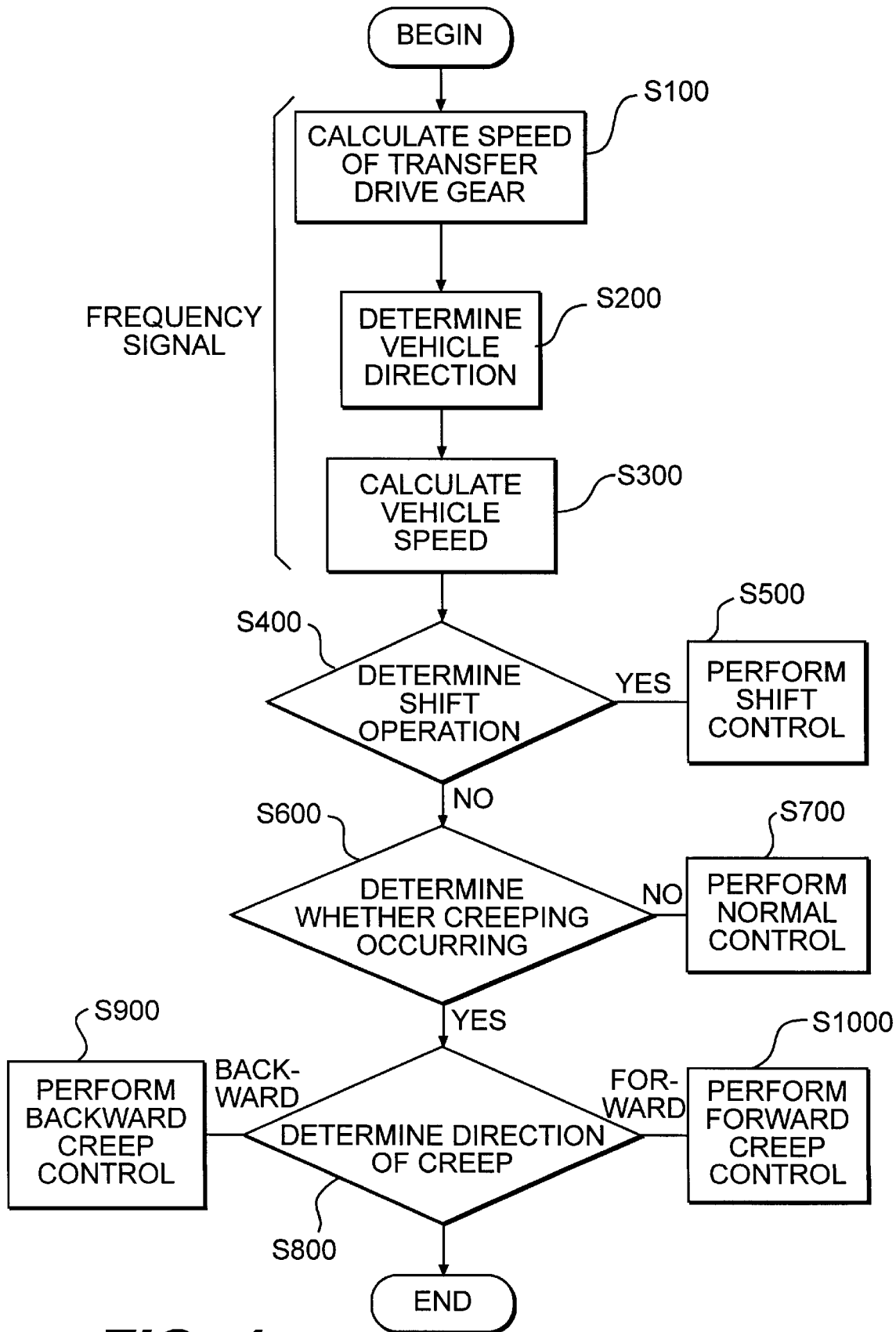
FIG. 4 is a flowchart showing a creep control according to a preferred embodiment of the present invention.

As shown in FIG. 4, a method for controlling a reverse shift restriction in a "D" range of a vehicle's automatic transmission according to a preferred embodiment of the present invention comprises calculating the rotation speed of a transfer drive gear, step s100, and identifying a rotating direction of the transfer drive gear and determining the corresponding vehicle direction, in accordance with a vehicle speed reed wavy pattern, step s200. Step s300 calculates from the rotation speed of the transfer drive gear the corresponding vehicle speed. Step s400 determines whether a shift operation is being performed. A shift operation is identified whenever the shift selector lever is something other than "P" or "N" mode. Next, as step s500, the signals representing the vehicle direction and speed are transmitted to a shift control part when step s400 determines whether a shift operation is being performed. When it has been determined that a shift operation is not being performed, step s600 determines whether creeping is occurring, in the conventional method. Step s700 constitutes transmitting the signal to a normal control routine when creeping is not occurring, and, step s800, constitutes determining the direction creeping is occurring, in a forward or reverse direction (Vss). This determination is based on the direction of motion determined in step s200. Step s900 transmits the signal to the forward creep control routine when the creep direction is in the forward direction; and step s1000, transmits the signal to the reverse creep control routine when the creep direction is in a reverse direction. As described above, the present invention uses a creep control logic and sensor to control the forward and reverse state of the vehicle. This control automatically places the vehicle in a condition most suitable to a driver's intentions, thereby providing driving convenience to the driver That is, when the vehicle is inadvertently reversed while in a forward-running state, the TCU identifies this and suitably controls the automatic transmission. This control prevents the vehicle from further reverse motion even when the driver does not depress the brake pedal. In addition, because the TCU identifies the direction and power of the vehicle regardless of the shift selector lever position, the hydraulic pressure can be accurately controlled when the shift selector lever is being shifted between the ranges. Finally, because it is possible to accurately control creeping of the automatic transmission vehicle, the life of the parts of the automatic transmission (e.g., various clutches and brakes) is greatly increased.

Figure 6:
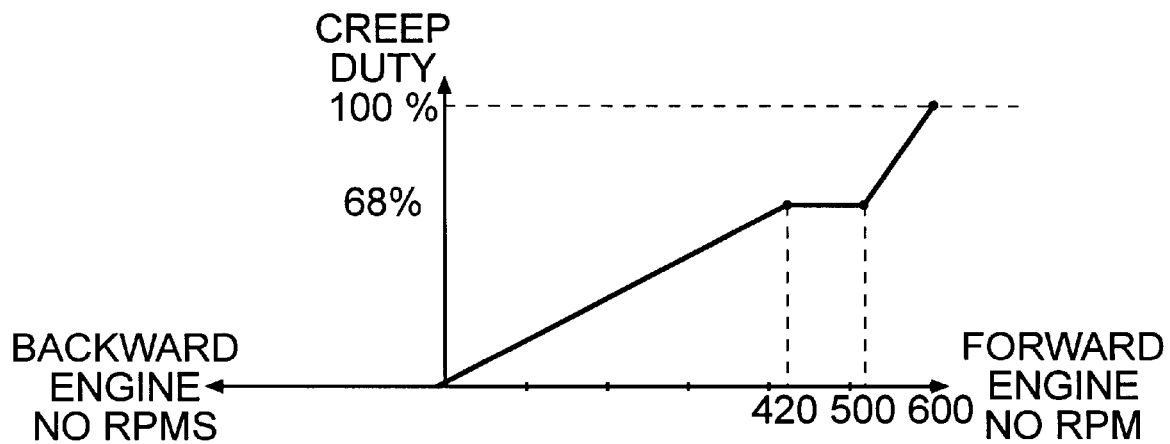
FIG. 6 is a PCSV duty output according to a preferred embodiment of the present invention.

Referring to FIG. 6, there is a graph illustrating a pressure control solenoid valve (PCSV) duty output of a preferred embodiment of the present invention. As shown in FIG. 6, the creep state of the vehicle is controlled by varying the hydraulic pressure in accordance with the forward and reverse directions of the vehicle, and the same creep state is always maintained under any load conditions. Therefore, even on a steep slope, the rearward pushing of the vehicle can be prevented.

Figure 5A:
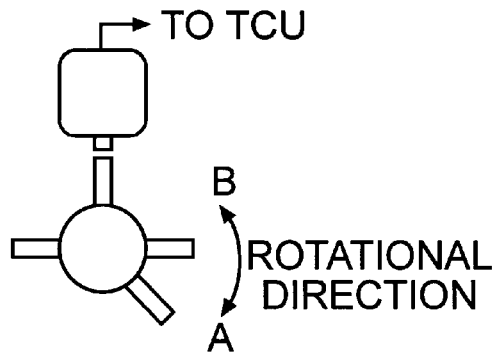
FIG. 5A is a view showing a vehicle reed switch according to a preferred embodiment of the present invention.
Figure 5B:
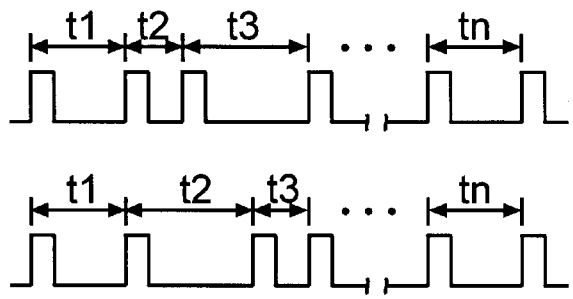
FIG. 5B is an output wavy pattern of a vehicle reed switch according to a preferred embodiment of the present invention.

Referring-to FIG. 5A, there is a diagram illustrating a vehicle speed reed switch 50. As shown in FIG. 5A, a plurality of reed sensors 52 are designed in an asymmetrical structure so as to be able to identify the forward and reverse directions of the vehicle. Thus, it can be shown that the output wavy pattern changes based on the rotating direction of the sensor. Thus, the TCU can identify which direction the vehicle is moving, forward or reverse, based upon the wavy pattern. This can be applied to another application where a control according to the rotating direction is required as well as in the automatic transmission vehicle. The sensor identifies direction by determining each output magnitude at predetermined time sections. Because of the asymmetrical design, the magnitude of the reed wavy pattern varies according to the rotating direction of vehicle speed reed switch 50. This magnitude and direction are checked by a microcomputer within the TCU, such that the forward and reverse driving directions of the vehicle can be identified in accordance with the variation rate of each output magnitude at each time section. FIG. 5B shows an output wavy pattern of vehicle speed reed switch 50 according to a preferred embodiment of the present invention. The following table shows an output wavy pattern according to the rotating direction of an embodiment of vehicle speed reed switch 50, illustrating an output magnitude depicted in FIG. 5B.

| Rotation/Term | T1 | T2 | T3 | ... | Tn |
|---|---|---|---|---|---|
| A direction | Medium | Small | Large | ... | Medium |
| B direction | Medium | Large | Small | ... | Medium |

Therefore, the creep control method of the automatic transmission vehicle according to the present invention has the advantages as follows:

First, when the vehicle is inadvertently reversed while in a forward-running state on an uphill grade, because the TCU identifies this and suitably controls the automatic transmission, the vehicle is not further reversed even when the driver does not depress the brake pedal. Second, because the TCU can identify the forward and reverse driving states of the vehicle, the TCU engages the kick down band with an optimal hydraulic pressure according to the driving direct of the vehicle, thereby precisely controlling creeping of the vehicle at a flat road surface. Finally, because it is possible to accurately control the creeping of the automatic transmission vehicle is possible, the life of the parts of the automatic transmission(e.g., for example, various clutches and brakes) is greatly increased.

While the invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A method of controlling an automatic transmission of a vehicle for preventing reverse motion of the vehicle while the transmission is in a drive position, comprising the steps of:

generating a frequency signal representing a speed of the vehicle and a direction of motion of the vehicle by measuring a rotational speed of a transfer drive gear;

determining whether creeping is occurring; and controlling the automatic transmission based on the result of said determination and said frequency signal, wherein the step of measuring the rotational speed of a transfer drive gear further includes generating a reed wavy pattern indicative of both the rotational speed of the transfer drive gear and a rotational direction of the transfer drive gear.

* * * * *